United States Patent [19]

Cheng

[11] Patent Number: 4,712,695

[45] Date of Patent: Dec. 15, 1987

[54] STRUCTURAL FRAME CONNECTOR

[76] Inventor: Huey-Der Cheng, 343 Fu Hsing South Rd., Sec. 2, Taipei, Taiwan

[21] Appl. No.: 889,396

[22] Filed: Jul. 25, 1986

[51] Int. Cl.$^4$ .............................................. A47B 47/00
[52] U.S. Cl. ..................................... 211/191; 211/182
[58] Field of Search .............. 211/191, 182, 183, 189, 211/186; 403/297, 171, 172, 176, 231, 403

[56] References Cited

U.S. PATENT DOCUMENTS

| 3,281,104 | 10/1966 | Hamilton | 211/183 X |
| 3,294,250 | 12/1966 | Evans | 211/190 |
| 4,544,069 | 10/1985 | Cavallini | 211/183 |
| 4,545,490 | 10/1985 | Hsiao et al. | 211/182 X |

FOREIGN PATENT DOCUMENTS

| 3439011 | 5/1985 | Fed. Rep. of Germany | 211/191 |
| 688166 | 3/1965 | Italy | 211/191 |

Primary Examiner—J. Franklin Foss
Assistant Examiner—Sarah A. Lechok Eley
Attorney, Agent, or Firm—Burns, Doane, Swecker & Mathis

[57] ABSTRACT

An assembly rack comprises a plurality of upright posts and lateral joining rods coupled together by a plurality of structural connectors. The posts and rods comprise L-shaped members which define longitudinal guide edges. Each connector comprises arms which fit respectively into the post and at least one of the lateral rods. The arms contain slots which receive the guide edges of the post and rod(s). Each arm carries a friction block which is actuated by a threaded bolt so as to be displaced away from the arm and into frictional contact with an inner surface of the respective post and rod(s). Thus, the arms become frictionally locked between the inner surface and guide edges of the respective post and rod(s).

7 Claims, 16 Drawing Figures

STRUCTURAL FRAME CONNECTOR

BACKGROUND OF THE INVENTION

The present invention relates to structural framework assemblies, and more particularly, to a novel structural connector for interconnecting metal or plastic angles to provide a load-supporting framing structure or rack with the horizontal joining rods being vertically adjustable in any position with respect to the vertical posts and the corner joints being concealed within the angles.

The conventional multipurpose angle irons have been used extensively for their properties of being relatively inexpensive and easily assembled and disassembled. However, these angle irons have sharp edges at both ends, which are likely to cause injury and cut the clothes particularly during assembly of various framing structures or during transport, and are now being less in use. Furthermore, in assembling into various storage racks the angles have to rely upon bolts or screws which pass directly through the holes in the angles and nuts to hold the various longitudinal and transverse angles together in firmness. In such kind of structural constructions having no reinforcing means, not only will the corner joints lack stability but due to the limitations imposed thereupon by the fitting holes and the distance between holes it is not possible to adjust the vertical positions of the various framing structures swiftly and at will when assembled, thus restricting its flexibility in use. Furthermore, such conventional structures lack aesthetic look because of the arrangement of holes in rows and the exposed corner joints and the screw nuts, in addition to the drawbacks that the protruding nuts might easily hook on the clothes. Another conventional display rack assembled with square or rounded metal pipes has no sharp edges, its surfaces being smooth without holes, aesthetically designed and being even more safety in use. Nevertheless, when several transverse pipes are connected to the main framework of the rack to form an assembly rack with multiple shelves, it is necessary to use for the main framework multi-section pipes joined together by means of joints, no single section pipes can be used here. For a type of assembly rack with multiple shelves, the structural strength and stability are not altogether satisfactory, and because of the permanent position in the joints, it is also not possible to adjust the level of the joints thereby restricting its flexibility in use. If the assembly rack is to be disassembled after use, not only has it to use a hammer to knock the joints off, but the openings at the joining ends of the pipes become enlarged once the rack has been dismantled. Under such conditions, unless those enlarged ends are removed the pipes can not be used again and by that it will also result in trouble in the re-use of the pipes.

References to an alternative and more popular assembly procedure in which the frame members or posts are constructed in a way that they can be joined by suitable fasteners, such as screws or bolts may be had from the disclosure in U.S. Pat. Nos. 4,347,015 and 4,545,490 the latter of which is jointly owned by the present inventor.

SUMMARY OF THE INVENTION

In accordance with the present invention, there is provided a novel and improved structural assembly rack which is easy to assemble and is capable of being freely adjustable in relation to the position in height.

Accordingly, it is a general object of the invention to provide a corner connection adapted for use in an assembly rack formed by putting together of a plurality of structural members or hole-free safety angles having at both ends guide edges and a plurality of joints slidably engaged in guide edges of the angles with the shelving members or horizontal connecting rods thereof being sectionlessly adjustable in height relative to the vertical posts.

It is another object of the invention to provide an improved connecting means which when fitted to the frame members permits the joint and fixing screws to be deeply concealed in the inside corners of the angles without being exposed to the outside thereby forming a concealed joint structure so that the protruding nuts may not hook on and damage clothes, and thus enhancing the commercial value of the entire framing structure.

It is a further object of the invention to provide a corner joint construction for an assembly rack which is easy to mount and assemble, and which when disassembled is capable of being re-used many times again.

It is a still further object of the invention to provide a framing structure or assembly rack which is capable of being assembled by using as main frame members the extruded material of light metals like aluminum alloys or of plastics, and also the angle bars of rolled material like iron.

BRIEF DESCRIPTION OF THE DRAWINGS

These and other objects and advantages of the invention will be apparent from the following description by reference to the accompanying drawings wherein.

DETAILED DESCRIPTION OF THE PREFERRED EMBODIMENT

Figure 1:
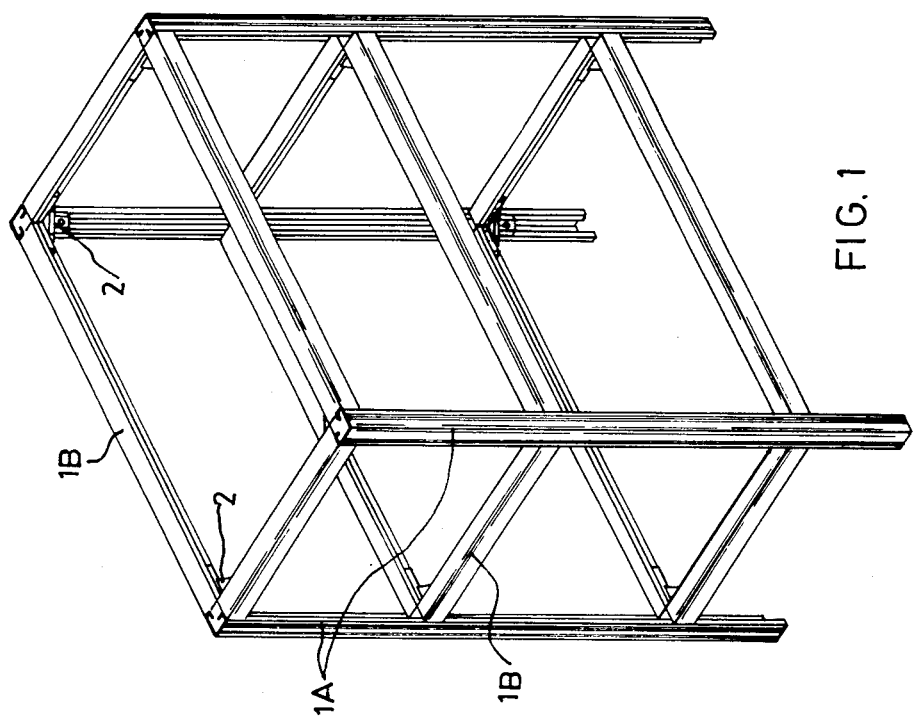
FIG. 1 is a perspective view of an assembly rack embodying the principles of the present invention.
Figure 5:
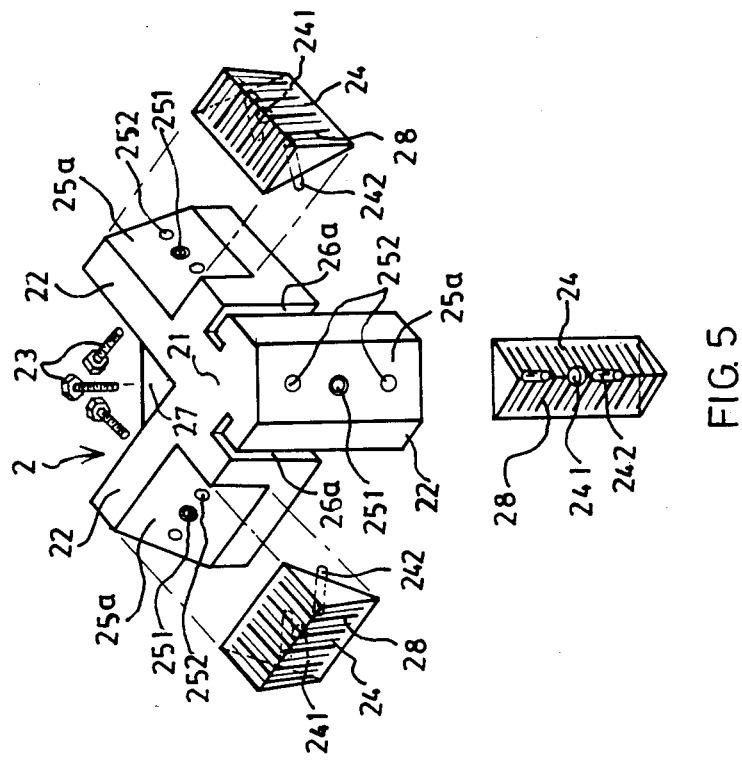
FIG. 5 is a front exploded perspective view of the corner connector shown in FIG. 3.
Figure 3:
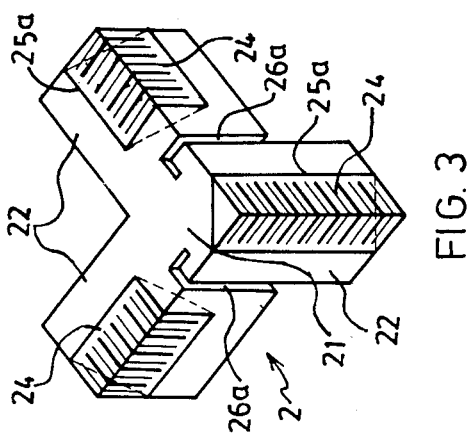
FIG. 3 is an outside perspective view of a corner connector of the present invention.
Figure 4:
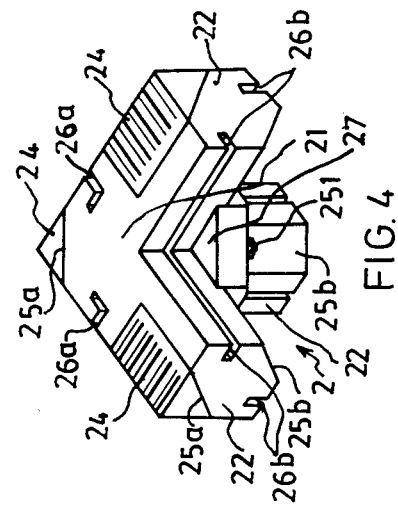
FIG. 4 is an inside perspective view of the corner connector shown in FIG. 3.

Referring to FIG. 1, an assembly rack or framing structure of the present invention is shown which comprises a plurality of holeless angle or frame members in the form of vertical posts 1A and horizontal joining rods 1B. These members 1A, 1B generally L-shaped in cross section are are interconnected transversely and longitudinally by means of a plurality of corner joint members 2, and arranged in a multi-tier rack.

Figure 2:
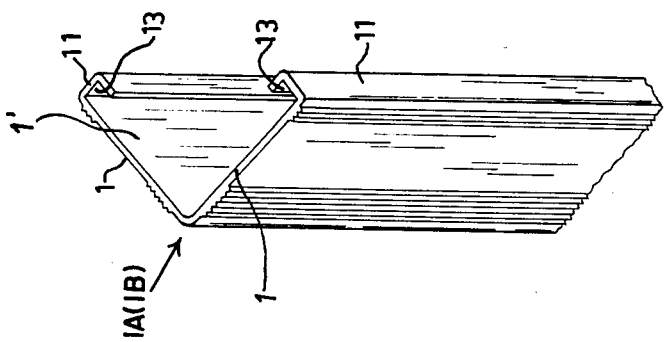
FIG. 2 is a perspective view of an extruded, holeless angle or frame member used in the construction of the structural frame of the invention.

As shown in FIG. 2, both post 1A and joining rod 1B are of identical profile and have two side 1 each bent inward perpendicularly twice forming two longitudinally extending parallel L-shaped guide edges 11. The sides 1 form an L-shape. In short, there is formed an angle or frame member whose cross section is especially in an L-shape, having no arrangement of any holes on the surfaces thereof for the fitting of the corner joint. Between the guide edges 11 and the sides 1 are defined two guide grooves 13. The sides 1 define an L-shaped inner surface S of the post 1A and joining rod 1B.

With reference to FIGS. 3 through 6 jointly, the corner joint 2 used in the frame connecting portion of the assembly rack consists of a branch main body 21 and a plurality of friction blocks 24 which are detachably attached to branch arms 22 of the main body 21. The main body 21 is formed by compression moulding from light metal alloys or by injection moulding from industrial plastics.

The main body 21 of the corner joint 2 has at least two (in the preferred embodiment there are three) branch arms 22 disposed at a right angle to each other and horizontally and perpendicularly extending. Each of the branch arms 22 is provided on the outer and the inner sides respectively with outside and inside bevel faces 25a, 25b formed by cutting away from the free end to the basal end at a 45° cutting angle certain lengths from the outer and inner angles of each arm 22. The two inner and outer bevel faces 25a, 25b are provided at its center with a screw hole 251 which passes completely through each arm 22. The outside bevel face 25a is further provided at a place near to the screw hole 251 with at least one (in the preferred embodiment there are two) positioning pinhole 252, the use of which will be described hereafter. The perpendicular branch arm 22 is provided on each side thereof at the basal end of each of the two horizontal branch arms 22 with an L-shaped longitudinally extending slot 26a which is adapted to receive and locate the guide edge 11 in the angle member 1 of the vertical posts 1A and the joining rod 1B. Next, the bottom and the rear faces of the horizontal branch arm 22, which are perpendicular to each other, are provided with parallel straight slots 26b similarly for engagement therein of a side 1, particularly a side of the horizontal joining rod 1B. Below the rear faces of the two horizontal branch arms 22 lies a triangular stiffening block 27 which also acts as a shelving support. A friction block 24 forms a triangle cylindrical body having a configuration of a right-angle isosceles triangle in section and is adapted to be complementary to each bevel face 25a of the branch arms 22. In fact, this friction block 24 corresponds to the cut-away angle portion of each branch arm 22, having at the center of its inside face a screw hole 241 which is in alignment with a screw hole 251, and adjacent to this screw hole 241 being formed at least one projection in the form of a positioning pin 242, which corresponds in position to a positioning pinhole 252. On the two surfaces of the friction block 24 which together constitute the right angle are formed friction surfaces 28 comprising many continuous channels. It will be appreciated that since such friction block 24 is firmly mounted on the bevel face 22a of each branch arm 22 by the insertion of the positioning pin 242 in the pinhole 252 and by screwing the fixing bolts 23 into the screw holes 251 and 241 respectively of the main body 21 and the friction block 24, and together with the corner joint 21 further forms into a single body, any loss of the parts is thus avoided.

Figure 7:
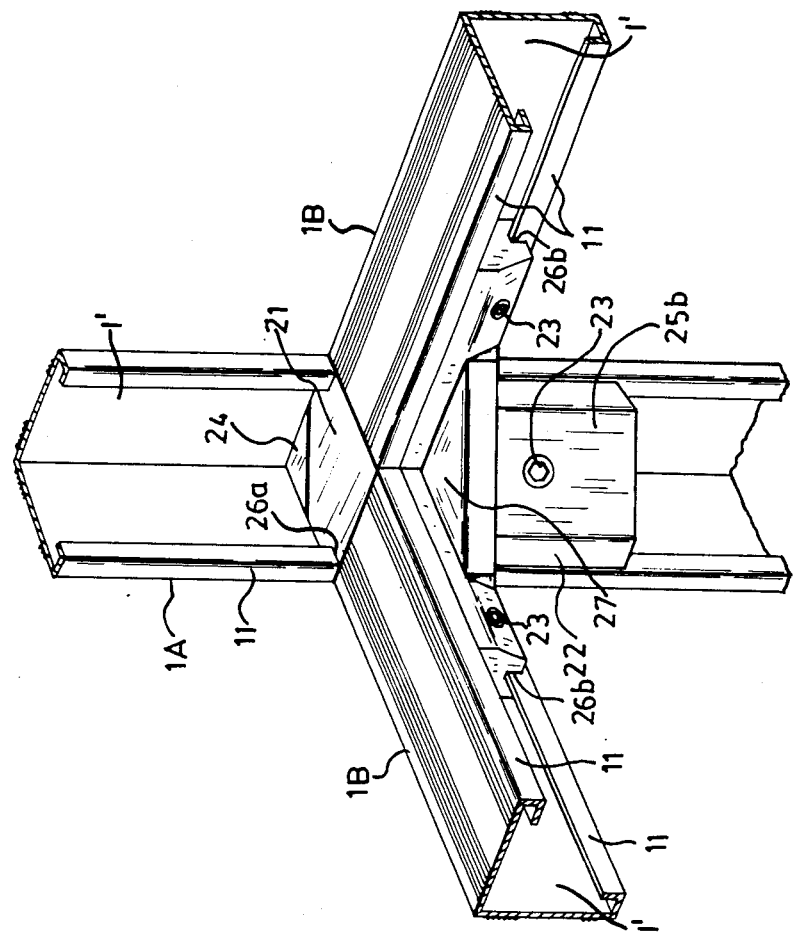
FIG. 7 is a perspective view of the structural frame corner assembly constructed in accordance with the present invention.
Figure 6:
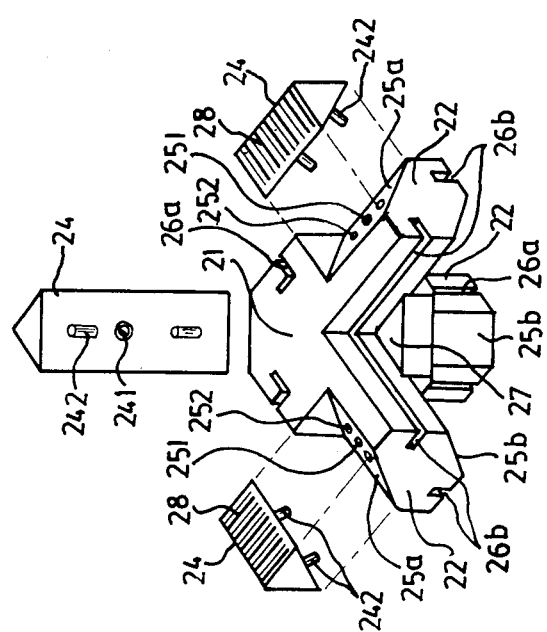
FIG. 6 is a rear exploded perspective view of the corner connector shown in FIG. 3.
Figure 8:
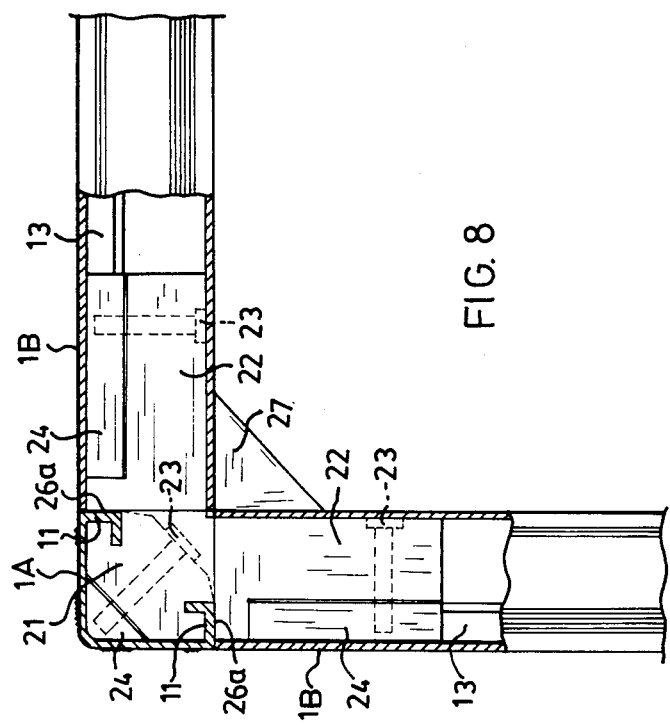
FIG. 8 is a top view of the corner assembly shown in FIG. 7 in partial seciton.

FIGS. 7 to 8 illustrate the construction of the major parts in the corner connecting portion of the assembly rack in which the connector construction includes a vertical post 1A, two horizontal joining rods 1B which together form an angle of 90° and an corner joint 2. During assemblage, the corner joint 2 is mounted in the vertical post 1A by inserting the vertical branch arm 22 thereof into one end of the post 1A and, in so inserting, the guide edges 11 are suitably received in the L-shaped slots 26a so that the joint 2 is vertically slidable along the inner sides of the post 1A by this engagement. After the joint 2 has been moved to a determined position, the bolts 23 are screwed tight and since the connector main body 21 can not be moved radially, only the friction block 24 is forced to move radially thereby permitting its friction surfaces 28 to press tightly against the inside wall of the post 1A and is thus secured therein. Afterward, two horizontal joining rods 1B are inserted onto the branch arms 22 such that enter the engaging slots 26b in the two horizontal branch arms 22. When the bolts 23 are screwed tight in the horizontal branch arms 22, each of the corresponding friction blocks 24 will then be forced to press against the inside face of the post 1A thereby permitting the joining of the connecting portion to be completed. Hence, by fitting and joining each of the connecting ends together in a similar manner either from top to bottom or vice versa in accordance with the number of tiers required it is possible to accomplish a multi-tier assembly rack in which no holes or bolts are visible from outside.

Figure 9:
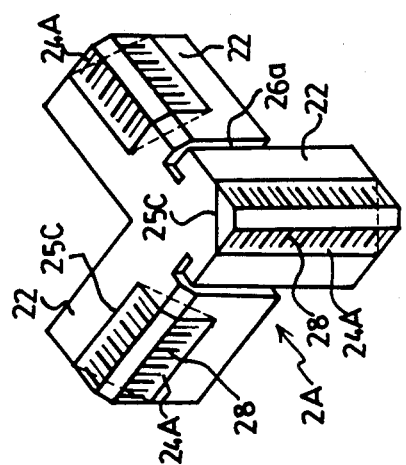
FIG. 9 is a perspective view of another embodiment of the corner connector of the invention.
Figure 10:
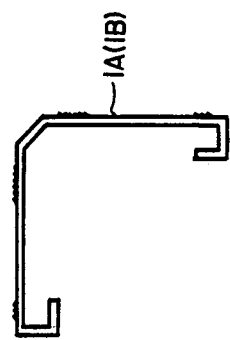
FIG. 10 is a sectional view of the angle or frame member adapted to the truncated angle in the corner connector of FIG. 9.

FIG. 9 illustrates another embodiment of the joint of the invention. This joint 2A is of the same construction as in the preceding embodiment except that the friction block 24A forms, instead of a triangle as in the above, a trapezoid in section. The basal end portion of the horizontal branch arm 22 forms a bevel face 25C in conformity with the upper face of the trapezoid. Hence, except those components which are the same as or correspond to the above are designated by the same numerals, it will be unnessary to go into details here. Nevertheless, this joint 2A is adapted for use in connection with the corner cut angle member 1A, 1B as shown in FIG. 10. When the joints 2A and the angle members 1A, 1B are used in assemblying a rack of the type, the steps and method will be the same as in the preceding embodiment and so also will be the effectiveness.

Figure 11A:
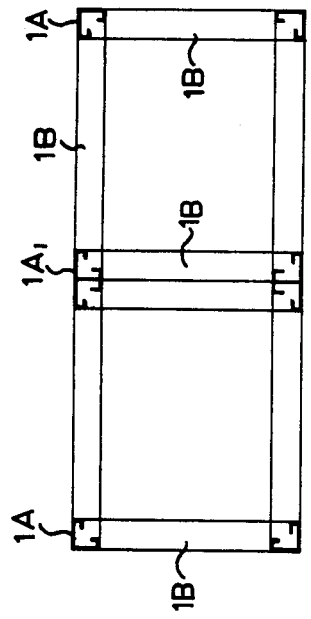
FIGS. 11(A) and (B) are plan views of two embodiments respectively of a large-size assembly rack using the corner connector construction of the invention.
Figure 11B:
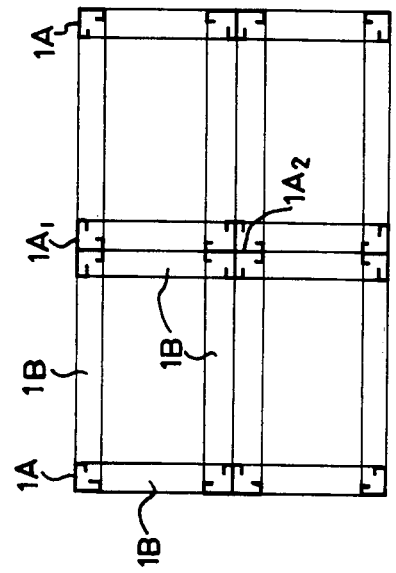
Figure 12A:
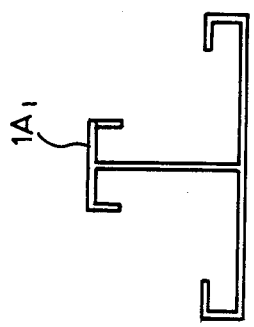
FIGS. 12(A) and (B) are sectional views respectively of the angle or frame member used in the vertical posts of FIG. 11.
Figure 12B:
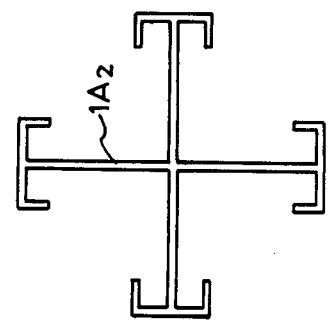

FIGS. 11(A) and (B) depict in plan view two embodiments of a large-size assembly rack. Although such a large-size rack may be constructed by combining together several assembly racks of the type as shown in FIG. 1, in order that the work may be handled in a more easier way and the rack be more sturdy in construction, the integral vertical posts 1A$_1$ and 1A$_2$ formed by extrusion molding of a T-shape or cross-shape in section as shown in FIGS. 12(A) and (B) may be employed as tri- and tetra- directional connecting members in the construction.

Figure 13:
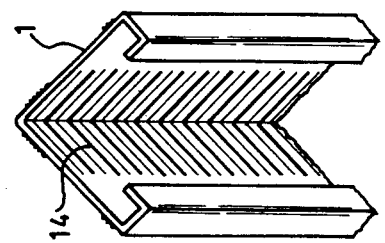
FIG. 13 is a perspective view of the embodiment of the angle or frame member showing a friction surface at the inside face thereof.

Furthermore, in order to increase the friction force at the contact surface of the angle member 1A, 1B with the friction block 24, the angle member may be formed on its inside face with a rough friction surface 14 comprising channels or other forms of slits as shown in FIG. 13. Again, if the assembly rack is adapted for use in supporting light load only, the above friction block 24 may exclude friction surface 28. In short, it will be noted that both conditions are applicable if one or all of the joint faces of the angle member and the friction block forms a friction surface or, both joint faces do not particularly form friction surfaces. However, the one with friction surfaces is capable of bearing much larger load.

Figure 14:
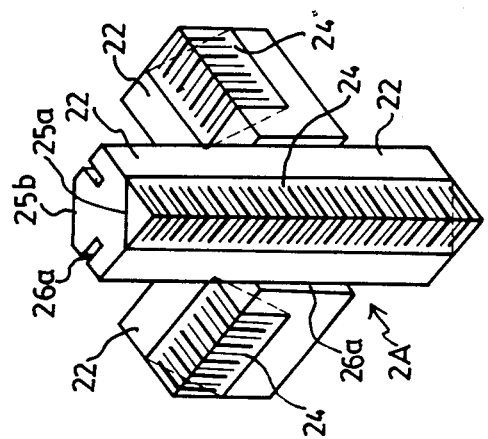
FIG. 14 is a perspective view of still another embodiment of the corner connector of the invention.

Again in considering the height of a framing structure, when the vertical posts used would be exceedingly long and difficult to transport a two-section or multi-section post could be used. Then, corner joint 2A having upper and lower vertical branch arms and two horizontal branch arms as shown in FIG. 14 may be used whereby the vertical branch arms would interconnect the post sections.

Thus having been designed and constructed in a way described above, the assembly of this invention is safe for use as a rack since both lateral sides of an angle member are inwardly bent to form smooth guide edges which are thus unlikely to cause cuts to hands or clothes during fitting-up, transportation or use of the rack. Again, since the guide edges increase the sectional area and the strength of the angle member, while the rack is in the standing position its stability, inflexibility and load capacity are greatly enhanced. Furthermore, the frame members of the invention are formed by extrusion molding of metal or plastics and surfaces of which do not require punching thereby simplifying manufacture. At the same time, since a whole single angle member may be used as the vertical post and the horizontal joining rod or the support for shelving constructed from a plurality of the horizontal joining rods may be vertically independently adjusted and fixed along the vertical post by means of joints, assembly and use are also simple and convenient. Moreover after assembly the joints together with the bolts and cushion blocks are concealed in the inside of the angle members. The angle members themselves are without any punched holes on the surfaces and during the manufacture the surfaces may as well be decorated with various patterns which will also add attraction to the appearance of the rack when assembled. Again during subsequent disassembly there will be no deformation with or damage to the angle members and the joints so disassembled and the components could thus be used again and again for assembly. At the same tiem, the reinforcing angle 28 formed on the joint may also act as shelving support for disposing shelves thereon which requires no separate support member thereby simplifying manufacture and assembly.

The foregoing is a description of the preferred embodiment of the invention and it should be understood that variations may be made thereto without departing from the true spirit of the invention as defined in the appended claims.

What is claimed is:

1. The assembly rack comprising:
    a plurality of upright posts each comprising angularly related sides having longitudinal guide edges, said sides defining an inner surface of said post;
    a plurality of lateral joining rods each comprising angularly related sides having longitudinal guide edges, said sides of said joining rod defining an inner surface of said joining rod; and
    a plurality of structural connectors each joining at least one joining rod to an upright post, said structural connectors each comprising:
        a body having at least two branch arms disposed at an angle relative to one another, one said branch arm including a pair of first guide slots for receiving said guide edges of a respective upright post such that said one branch arm can be assembled into said upright post, the other of said branch arms including a pair of second guide slots for receiving said guide edges of a respective joining rod such that said joining rod can be assembled onto said other branch arm,
        a friction block mounted on each of said branch arms and arranged to face said inner surface of a respective post and joining rod when said branch arms are assembled to said post and joining rod, and
        threaded bolts operably connected to said branch arms and their respective friction blocks for moving said friction blocks independently of one another and away from said branch arms into frictional contact with said inner surfaces of said post and joining rod to frictionally lock said branch arms between said inner surfaces and said guide edges of their respective post and joining rod.

2. An assembly rack according to claim 1, wherein said friction blocks each include roughened faces which engage said inner surface of respective said post and joining rod.

3. An assembly rack according to claim 1, wherein portions of said inner surfaces of said post and joining rod which are engaged by said friction blocks are roughened.

4. An assembly rack according to claim 1, wherein each said friction block is guidingly mounted on its respective branch arm by a guide pin mounted on one of said friction block and said branch arm and slidingly received in a hole in the other of said friction block and said branch arm.

5. An assembly rack according to claim 1, wherein said inner surface of said post comprises two angularly related faces, and said inner surface of said joining rod comprises two angularly related faces, each of said friction blocks having two angularly related faces which engage both said angularly related faces of respective said post and joining rod.

6. An assembly rack according to claim 5, wherein said friction blocks are each triangular in cross-section.

7. An assembly rack according to claim 5, wherein said friction blocks are each trapezoidal in cross-section.

* * * * *

UNITED STATES PATENT AND TRADEMARK OFFICE
CERTIFICATE OF CORRECTION

PATENT NO. : 4,712,695

DATED : December 15, 1987

INVENTOR(S) : Huey-Der Cheng

It is certified that error appears in the above-identified patent and that said Letters Patent is hereby corrected as shown below:

The date of DEC. 15, 1988 at the top of each sheet of drawings is incorrect and should read:

--Dec. 15, 1987--.

Signed and Sealed this

Second Day of August, 1988

Attest:

DONALD J. QUIGG

*Attesting Officer*   *Commissioner of Patents and Trademarks*